Patented July 23, 1940

2,209,000

UNITED STATES PATENT OFFICE 2,209,000

PREPARATION OF METHYL CHLOROFORM

Howard S. Nutting and Myron E. Huscher, Midland, Mich., assignors to The Dow Chemical Company, Midland, Mich., a corporation of Michigan No Drawing. Application July 17, 1937, Serial No. 154,283

6 Claims. (Cl. 260—658)

This invention concerns an improved method of making 1,1,1-trichlorethane, commonly known and hereinafter referred to as methyl chloroform.

German Patent No. 523,436 teaches that methyl chloroform may be prepared by saturating freshly prepared monomeric 1,1-dichlorethylene with dry hydrogen chloride gas and thereafter gradually adding aluminum chloride or iron chloride while cooling to avoid temperatures above 35° C. According to the patent, the exothermic reaction which occurs may initially be very rapid.

We have tested the method of said German patent, but have found it to possess a number of disadvantages which render it unsuited to commercial practice. For instance, if the procedure of the patent is followed, the conversion of 1,1-dichloroethylene to methyl chloroform is necessarily small due to the limited solubility of hydrogen chloride in 1,1-dichlorethylene at ordinary temperatures and pressures (only 0.014 mol of hydrogen chloride dissolves per mol of 1,1-dichlorethylene at 15° C. and at atmospheric pressure). Furthermore, if a molecular proportion of hydrogen chloride be dissolved in the 1,1-dichlorethylene by means of increased pressure or very low temperature (which conditions are not disclosed in the patent), the reaction, when started, is violent and entirely too hazardous for commercial practice. Also, the method of the patent involves gradual addition of a solid catalyst to a liquid saturated with hydrogen chloride, which operation necessitates careful control and may require exposure of workmen to the toxic fumes of hydrogen chloride.

We have now found that the above disadvantages may be avoided and that methyl chloroform may be produced conveniently and in good yield from 1,1-dichlorethylene by first dissolving or suspending a Friedel-Crafts catalyst in the 1,1-dichlorethylene and thereafter introducing gaseous hydrogen chloride into the mixture. Although the reaction is ordinarily carried out at room temperature or thereabout, it may be carried out satisfactorily at temperatures as low as 0° C. or as high as 75° C. Accordingly, temperature control in practising the invention is relatively simple. Also, the reaction may be conducted at atmospheric or superatmospheric pressure, and the hydrogen chloride may, without difficulty, be added at any desired rate. Furthermore, the reaction may be carried out conveniently in an autoclave or other closed reactor without exposing workmen to the toxic reaction mixture.

The 1,1-dichlorethylene reactant may contain agents such as phenol, substituted phenols, etc., which have the property of stabilizing the compound against polymerization. We have found that such stabilizing agents, in the proportions usually employed, do not interfere seriously with the reaction for formation of methyl chloroform. However, the presence of such agent is not required and, when convenient, we preferably employ freshly prepared pure 1,1-dichlorethylene in the reaction.

As catalyst for the reaction, we prefer to use anhydrous ferric chloride, since it promotes smooth and not unduly rapid reaction between the hydrogen chloride and 1,1-dichlorethylene. However, other Friedel-Crafts catalysts, such as aluminum chloride, stannic chloride, boron trifluoride, etc., may be used. We ordinarily employ between 0.006 and 0.007 mol of catalyst per mol of 1,1-dichlorethylene, but other proportions may be employed, if desired.

In making methyl chloroform according to the invention, a Friedel-Crafts catalyst, preferably anhydrous ferric chloride, is added to 1,1-dichlorethylene in the proportion stated above, after which dry hydrogen chloride is introduced at such a rate that the temperature does not rise substantially above 75° C. In practice it is sometimes more convenient to introduce the hydrogen chloride at a relatively rapid rate, while maintaining the temperature of reaction below 75° C. by means of cooling coils carrying cold brine or other cooling agent. When the 1,1-dichlorethylene-catalyst mixture no longer absorbs hydrogen chloride, the reaction is complete. The product is recovered by adding water to the crude reaction mixture, neutralizing the free acid contained therein, and steam distilling. When pure 1,1-dichlorethylene has been employed in the reaction, the product recovered by the steam distillation is usually substantially pure methyl chloroform. If necessary, the product may, of course, be further purified by fractional distillation.

As hereinbefore stated, the reaction may be carried out under increased pressure, but in large scale operations it is more economical to operate at atmospheric pressure or slightly above. In practice we prefer to place the desired quantities of 1,1-dichlorethylene and catalyst in a kettle-type reactor equipped with cooling coils, and thereafter introduce hydrogen chloride under 10 to 15 pounds gauge pressure as fast as it is used up by reaction. As an alternative procedure, we may intermittently charge hydrogen chloride under pressure into an autoclave containing 1,1-dichlorethylene and the catalyst, the mixture being agitated between each such addition to promote the desired reaction. In such mode of operation, care should be taken not to introduce the hydrogen chloride in too great a proportion at any one time, since otherwise the reaction may occur too rapidly for proper dissipation of heat generated by the reaction with resultant overheating of the mixture, generation of high pressures, and by-product formation. In practice we avoid adding more than 0.4 mol of hydrogen chloride per mol of 1,1-dichlorethylene at any one time during such intermittent mode of operation.

The following examples illustrate several ways in which the principle of the invention has been applied, but are not to be construed as limiting the invention:

Example 1

245 grams (2.53 mols) of 1,1-dichlorethylene and 5.0 grams of anhydrous ferric chloride were placed in a balloon flask fitted with a hydrogen chloride inlet and stirrer. Hydrogen chloride gas which had been previously dried by passing through sulfuric acid was introduced below the surface of the 1,1-dichlorethylene at such a rate that the pressure within the flask remained at 10-15 mm. above atmospheric pressure. At the beginning of the reaction the hydrogen chloride was absorbed very rapidly, but the rate of absorption decreased somewhat as the reaction progressed. At the close of the reaction, the gas pressure in the flask increased suddenly. During operation as just described, the flask was immersed in a water bath maintained at 20°-25° C. The reaction products were mixed with water and distilled wet until water came over at 100° C. The organic layer from the distillate was dried over calcium chloride. The product consisted of 1.6 grams of unconverted 1,1-dichlorethylene and 287 grams (83.5 per cent of the theoretical yield) of methyl chloroform.

Example 2

125 grams (1.29 mols) of 1,1-dichlorethylene and 5.0 grams of anhydrous ferric chloride were placed in an iron bomb fitted with a pressure gauge and hydrogen chloride inlet. Hydrogen chloride was passed into the bomb intermittently in small charges so as to maintain a pressure within the bomb of 195 pounds per square inch. During reaction, the charge was agitated and the temperature was allowed to rise as high as 75° C. After completion of the reaction, as indicated when the pressure within the bomb ceased to fall from absorption of hydrogen chloride, the bomb was cooled and the charge removed and steam distilled. In the distillate there was obtained 156.0 grams (1.17 mols) of substantially pure methyl chloroform. The yield was 90.7 per cent of the theoretical, based on the quantity of 1,1-dichlorethylene used.

Example 3

130 pounds (1.34 pound mols) of 1,1-dichlorethylene, containing about 0.5 per cent by weight of phenol, and 3.3 pounds of anhydrous ferric chloride were loaded into a 37 gallon reactor fitted with cooling coils, stirrer, and an inlet and outlet for vapors. Hydrogen chloride, obtained as a by-product from a chlorination process, was passed through a trap to remove entrained matter, dried, and admitted to the reactor under 2-5 lbs. gauge pressure. The reaction temperature was maintained at 25°-35° C. by passing water through the cooling coils of the reactor. The exit gases were passed through a vertical condenser, cooled to −5° C., washed with water to remove hydrogen chloride and finally discharged into the air. Completion of reaction was indicated by an abrupt increase in the hydrogen chloride content of the exit gas. The methyl chloroform thus obtained was purified by steam distillation, 130.8 pounds (0.98 pound mol) of methyl chloroform being obtained.

Other modes of applying the principle of our invention may be employed instead of those explained, change being made as regards the method herein disclosed, providing the step or steps stated by any of the following claims or the equivalent of such stated steps be employed.

We therefore particularly point out and distinctly claim as our invention:

1. In a method of preparing methyl chloroform, the step which comprises introducing hydrogen chloride into a mixture of 1,1-dichlorethylene and a hydrochlorination catalyst.

2. In a method of preparing methyl chloroform, the step which comprises introducing substantially anhydrous hydrogen chloride into a mixture of 1,1-dichlorethylene and a hydrochlorination catalyst, while maintaining the mixture at a temperature below 75° C.

3. In a method of preparing methyl chloroform, the step which comprises introducing substantially anhydrous hydrogen chloride into a mixture of 1,1-dichlorethylene and a Friedel-Crafts catalyst, while maintaining the mixture at a pressure of from 1 to 200 atmospheres and a temperature below 75° C.

4. In a method of preparing methyl chloroform, the step which comprises introducing substantially anhydrous hydrogen chloride into a mixture of 1,1-dichlorethylene and a Friedel-Crafts catalyst, while maintaining the mixture at a pressure slightly above atmospheric and a temperature below 75° C.

5. In a method of preparing methyl chloroform, the step which comprises introducing, at a pressure slightly above atmospheric, substantially dry hydrogen chloride into a mixture of 1,1-dichlorethylene and from 1 to 6 per cent of ferric chloride, while maintaining the mixture at a temperature between 25° and 35° C.

6. In a method of preparing methyl chloroform, the step which comprises introducing substantially dry hydrogen chloride into a mixture of 1,1-dichlorethylene and aluminum chloride while maintaining the mixture at a pressure slightly above atmospheric and at a temperature between 25° and 35° C.

HOWARD S. NUTTING.
MYRON E. HUSCHER.